(12) United States Patent
Mo

(10) Patent No.: US 12,208,714 B2
(45) Date of Patent: Jan. 28, 2025

(54) LIMITING DEVICE AND CHILD SAFETY SEAT

(71) Applicant: Bambino Prezioso Switzerland AG, Steinhausen (CH)

(72) Inventor: Xiaolong Mo, Guangdong (CN)

(73) Assignee: Bambino Prezioso Switzerland AG, Steinhausen (CH)

( * ) Notice: Subject to any disclaimer, the term of this patent is extended or adjusted under 35 U.S.C. 154(b) by 0 days.

(21) Appl. No.: 18/599,733

(22) Filed: Mar. 8, 2024

(65) Prior Publication Data

US 2024/0208378 A1   Jun. 27, 2024

Related U.S. Application Data

(63) Continuation of application No. 17/580,270, filed on Jan. 20, 2022, now Pat. No. 11,958,389.

(30) Foreign Application Priority Data

Jan. 27, 2021 (CN) .......................... 202120231352.3

(51) Int. Cl.
*B60N 2/28* (2006.01)
(52) U.S. Cl.
CPC ................................ *B60N 2/2884* (2013.01)
(58) Field of Classification Search
CPC .................................................. B60N 2/2884
See application file for complete search history.

(56) References Cited

U.S. PATENT DOCUMENTS

| 2014/0077545 | A1 | 3/2014 | Neuber |
| 2016/0039319 | A1 | 2/2016 | Zhang |

FOREIGN PATENT DOCUMENTS

| CN | 104456957 A | 3/2015 |
| CN | 204506615 U | 7/2015 |
| CN | 205955419 U | 2/2017 |
| CN | 107089172 A | 8/2017 |
| CN | 109895664 A | 6/2019 |
| CN | 209063931 U | 7/2019 |
| CN | 110271464 A | 9/2019 |
| CN | 210239365 U | 4/2020 |

(Continued)

OTHER PUBLICATIONS

Office Action issued in corresponding Chinese Application No. 2021116605254 dated Dec. 6, 2023.

(Continued)

*Primary Examiner* — Anthony D Barfield
(74) *Attorney, Agent, or Firm* — Volpe Koenig

(57) ABSTRACT

According to the application, a limiting device is used for limiting a pivoting of a side impact protection block in respect to a child safety seat. The limiting device includes: a mounting portion, located on a seat body of the child safety seat and arranged close to the side impact protection block; and a restricting member, has a free end and is arranged on the mounting portion, such that the restricting member is movable between a locked and released position. In the locked position, the free end of the restricting member abuts against the side impact protection block to prevent the side impact protection block from moving in an unfolding direction, and in the released position, the free end of the restricting member is away from the side impact protection block to allow side impact protection block to move in the unfolding direction.

16 Claims, 14 Drawing Sheets

(56) References Cited

FOREIGN PATENT DOCUMENTS

| CN | 111845481 A | 10/2020 |
| CN | 111845483 A | 10/2020 |
| CN | 112238798 A | 1/2021 |
| IN | 201847008135 A | 5/2018 |

OTHER PUBLICATIONS

Search Report issued in corresponding Chinese Patent Application No. 202120231352.3 on Aug. 2, 2021, consisting of 15 pp.
"Notice of Allowance Issued in Corresponding Chinese Patent Application No. 202111660525.4", Mailed Date: Apr. 29, 2024, 7 pages.
Zhang, et al., "Lateral Impact Sled Test System for Child Restraint System Based on ECE R129", In J Automotive Safety and Energy, vol. 6, No. 3, 2015, pp. 237-244, along with English Translation of Abstract.

LIMITING DEVICE AND CHILD SAFETY SEAT

CROSS-REFERENCE TO RELATED APPLICATIONS

This application is a continuation of U.S. patent application Ser. No. 17/580,270, filed Jan. 20, 2022, now U.S. Pat. No. 11,958,389, which claims the benefit of priority of Chinese Patent Application No. 202120231352.3, entitled LIMITING DEVICE AND CHILD SAFETY SEAT, filed on Jan. 27, 2021, the contents of which are incorporated herein by reference in their entirety for all purposes.

TECHNICAL FIELD

The application relates to a limiting device, and also to a child safety seat with a limiting device.

BACKGROUND

A safety seat is an apparatus installed on a car seat and restraining a child on it by a restraint arrangement. In the event of an emergency braking or accidental collision of the car, the safety seat reduces the impact on the child through its shell and restrains the child's body movement through its restraint arrangement, so as to reduce injury to infants in accidents, and ensure the safety of infants and young children in the car.

In some safety seats, side impact protection devices are provided to reduce lateral impacts received by the seats. One of the side impact protection devices includes side wings extending outside on both sides of a seat, the side wings may be arranged to have a folded position and an unfolded position. In the folded position, the side wings are attached to an outside of the seat to reduce the space occupied; in the unfolded position, the side wings extend outward from the side of the seat to provide a buffer between the seat and the car. The side impact protection device may be arranged to be automatically unfolded, that is, when the child is seated in the seat, the side impact protection device automatically moves from the folded position to the unfolded position, and e.g., the movement is driven by a preloaded spring.

Generally, considering the versatility of the safety seat, the side impact protection devices would be provided on both sides of the seat. However, when the safety seat is arranged close to the car door, only the side impact protection device facing the car door has an actual effect in fact. In such a circumstance, the side impact protection device on the other side (i.e., the side facing the interior of the car) is not expected to automatically unfolded. Therefore, a limiting device is needed to limit the side impact protection device in the folded position.

SUMMARY

According to the application, a limiting device is used for limiting a pivoting of a side impact protection block in respect to a child safety seat, and the limiting device includes: a mounting portion, located on a seat body of the child safety seat and arranged close to the side impact protection block; and a restricting member, has a free end and is arranged on the mounting portion, such that the restricting member is movable between a locked position and a released position. In the locked position, the free end of the restricting member abuts against the side impact protection block to prevent the side impact protection block from moving in an unfolding direction in respect to the child safety seat, and in the released position, the free end of the restricting member is away from the side impact protection block to allow side impact protection block to move in the unfolding direction in respect to the child safety seat.

In an embodiment, the mounting portion has an arc-shaped sliding slot that is concavely formed toward the seat body and centered on the rotating shaft, a limiting protrusion is disposed on a side face of the restricting member facing the mounting portion, the limiting protrusion is accommodated in the sliding slot, and when the restricting member rotates in respect to the mounting portion, the limiting protrusion slides along the sliding slot.

In an embodiment, the sliding slot of the mounting portion has a side wall on one side facing the rotating shaft, and has no side wall on the other side away from the rotating shaft, and the limiting protrusion slides along the side wall of the sliding slot.

In an embodiment, positioning portion raised from the sliding slot are respectively at both ends of the sliding slot, so as to provide a positioning when the limiting protrusion slides to both ends of the sliding slot.

In an embodiment, when the limiting protrusion of the restricting member is located in a middle of the sliding slot, the restricting member is located in its locked position; and when the limiting protrusion is located at either end of the sliding slot, the restricting member is located at its released position.

In an embodiment, the restricting member is symmetrical flat along its longitudinal centerline, and has a lateral width gradually increasing from the rotating end to the free end.

In an embodiment, the restricting member is provided with a contacting portion on a side face of the free end facing the mounting portion, for contacting the side impact protection block in the locked position, and wherein the rotating shaft, the limiting protrusion and the contacting portion are sequentially located in the longitudinal centerline, and the limiting protrusion is closer to the rotating shaft than the contacting portion.

In an embodiment, the contacting portion is an arc bulge protruding from a side face of the restricting member facing the mounting portion and extending along a rotation direction of the restricting member.

In an embodiment, the restricting member is arranged to slide in a direction approaching and away from the side impact protection block; the mounting portion is provided with a mushroom head and a slider protruding from a side face of the seat body, the slider is located on one side of the mushroom head and extends along a sliding direction of the restricting member; the restricting member is provided with a restricting member hole and a slider hole respectively extending along the sliding direction of the restricting member; and the mushroom head is inserted in the restricting member hole, and the slider is inserted in the slider hole.

According to the application, a child safety seat includes: a seat body; a side impact protection block, located on a side of the seat body and having pivoted end pivotally connected to the seat body and a ejected end opposite to the pivoted end, the side impact protection block has a folded position and an unfolded position, in the folded position, the ejected end is attached to a side face of the seat body, and in the unfolded position, the ejected end is away from the face of the seat body side; and the limiting device according to the application, the limiting device is arranged on a side close to the ejected end of the side impact protection block, and is used to prevent the ejected end from moving away from the side face of the seat body in the locked position.

In an embodiment, a pivoting shaft of the side impact protection block is substantially perpendicular to the rotating shaft of the restricting member.

BRIEF DESCRIPTION OF THE DRAWINGS

Embodiments of the application will be described in detail below with reference to the accompanying drawings, in which.

DETAILED DESCRIPTION

Although the application is illustrated and described with reference to specific embodiments, the application should not be limited to the illustrated details. Specifically, within the scope of the equivalents of the attached claims and without departing from the application, various modifications can be made to these details.

The descriptions of "front," "rear," "up," "down" and other directions mentioned in this specification are only used for the convenience of understanding, and the application is not limited to these directions, but can be adjusted according to actual conditions.

Figure 1:
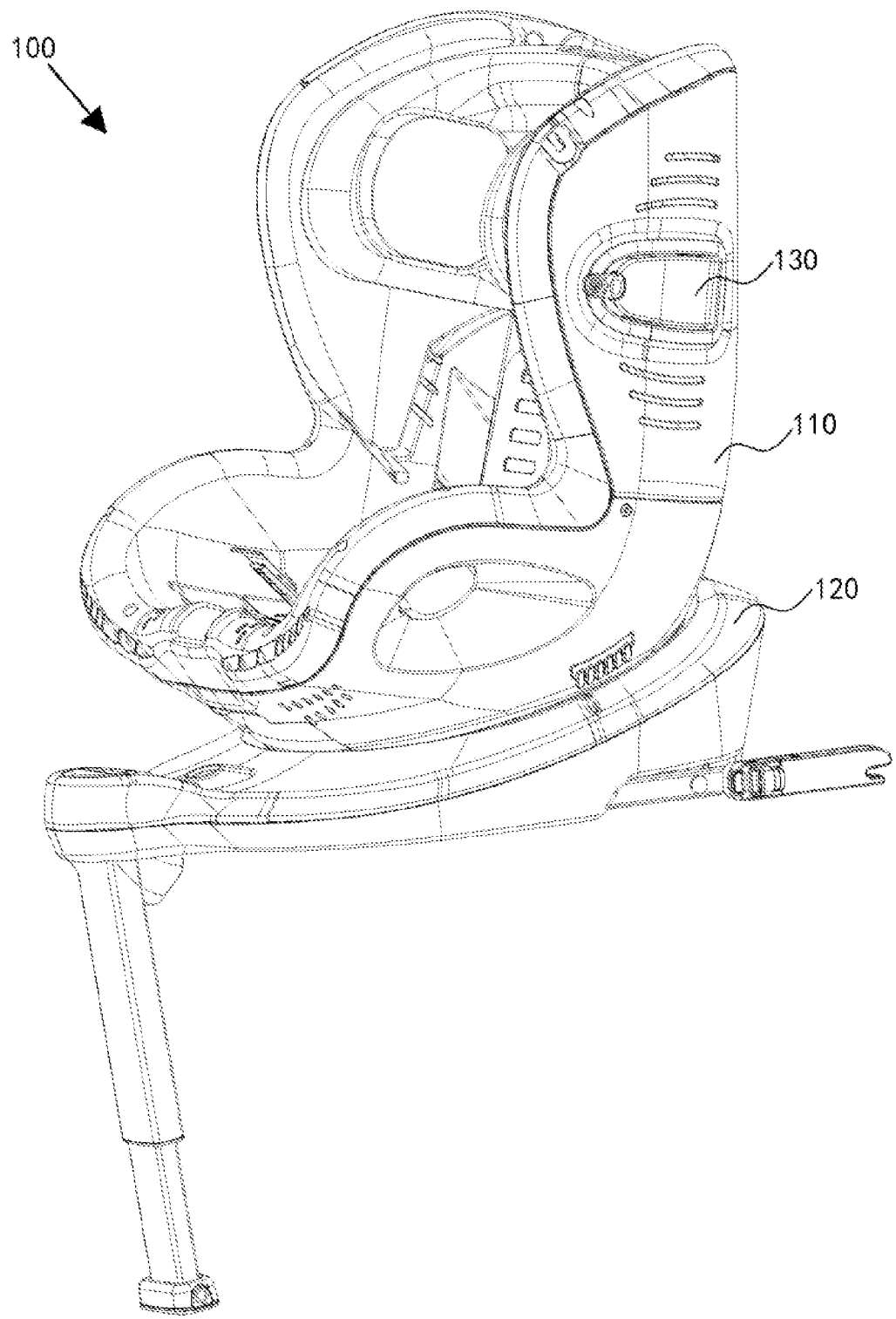
FIG. 1 is a perspective view of a seat according to the application, in which a limiting device is in a locked position.

Firstly please refer to FIG. 1. FIG. 1 is a perspective view of a child safety seat 100 according to the application, in which a limiting device 150 is in a locked position. The child safety seat 100 includes a seat body 110 and a base 120 under the seat body 110. The base 120 is a component which fixes the entire child safety seat 100 to a vehicle, and is provided with fixing devices such as straps. In an embodiment, the seat body 110 is coupled to the base 120 in a manner that can slide back and forth and can rotate about a substantially vertical axis, so that the seat body 110 is in a most comfortable and safest position and posture.

A side impact protection block 130 is disposed on an outer side of the seat body 110. FIG. 1 shows one side impact protection block 130, though it should be understood, the other side of the seat body 110 may be provided with substantially the same (or substantially symmetrical) side impact protection block, moreover, the side impact protection block provided on the other side of the seat body 110 may have a structure or appearance as same as or different from that of the side impact protection block 130. For sake of conciseness, exemplary description will be given below under the condition that the side impact protection block provided on the other side of the seat body 110 is same as the side impact protection block 130.

A function of the side impact protection block 130 is to provide a buffer between the two sides of the child safety seat 100 and the internal structure of the vehicle, so as to better protect the child in the child safety seat 100 in the event of a vehicle collision. For this reason, in a working state of the side impact protection block 130, the side impact protection block 130 can be ejected from both sides of the seat body 110, and is located in an unfolded position to be substantially perpendicular to the side of the seat body 110 (FIG. 4), so as to intervene between the side of the seat body 110 and the car door. Moreover, in an non-working state of the side impact protection block 130, the side impact protection block 130 can be folded to fit the seat body 110, and can be stored in a corresponding recess on the side of the seat body 110, so as to reduce a space occupied by the child safety seat 100, and provide a neat appearance of the child safety seat 100.

The side impact protection block 130 may be arranged to be manually operated to switch between the unfolded position and the folded position, or may also be arranged to automatically ejected. That is, when a child is seated in the seat body 110, the side impact protection block 130 automatically senses the seated child, and thus is ejected from the folded position to the unfolded position As mentioned above, the side impact protection block 130 located on the side of the seat body 110 close to the car door can effectively buffer the collision between the child safety seat 100 and the car, and the side impact protection block located on the other side of the seat body 110 away from the car door has less effect and occupies a space. Therefore, it is necessary to prevent the side impact protection block on the side away from the car door from being automatically ejected. A function of the limiting device 150 according to the application is to prevent the side impact protection block 130 from being automatically ejected, so as to avoid the side impact protection block 130 facing the inner side of the vehicle from being ejected and occupying the interior space of the vehicle meaninglessly.

Figure 2:
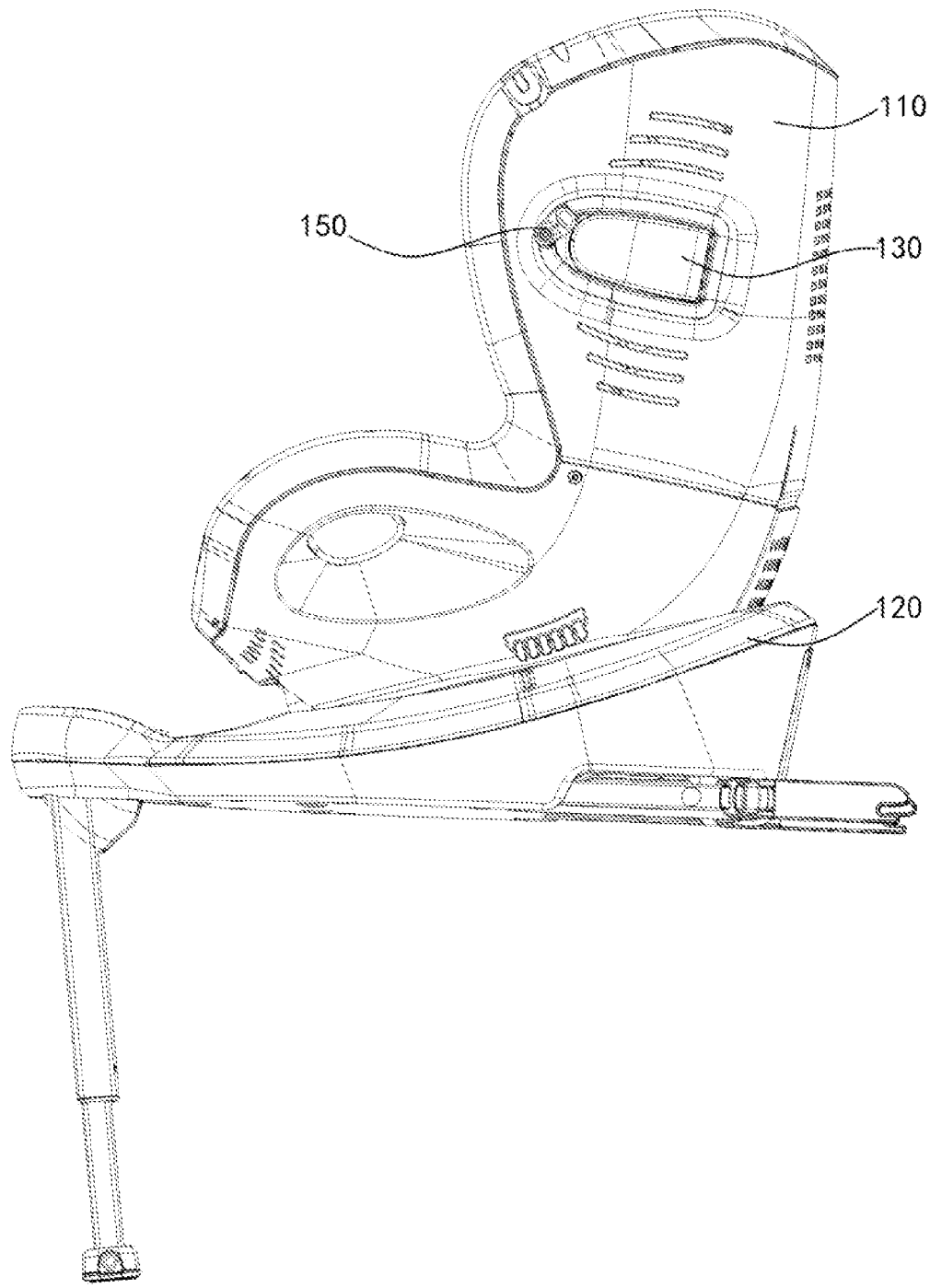
FIG. 2 is a perspective view of the seat according to the application, in which the limiting device is in a released position and a side impact protection block is in a folded position.

Now refer to FIG. 2. FIG. 2 is a perspective view of the child safety seat 100 according to the application, in which the limiting device 150 is in a released position and the side impact protection block 130 is in the folded position. At this time, it can be seen, compared to the position in FIG. 1, the limiting device 150 is rotated by an angle around an axis that is substantially perpendicular to the side face of the seat body 110, so that the side impact protection block 130 is no longer blocked. Therefore, the side impact protection block 130 can be moved to its unfolded position.

Figure 3:
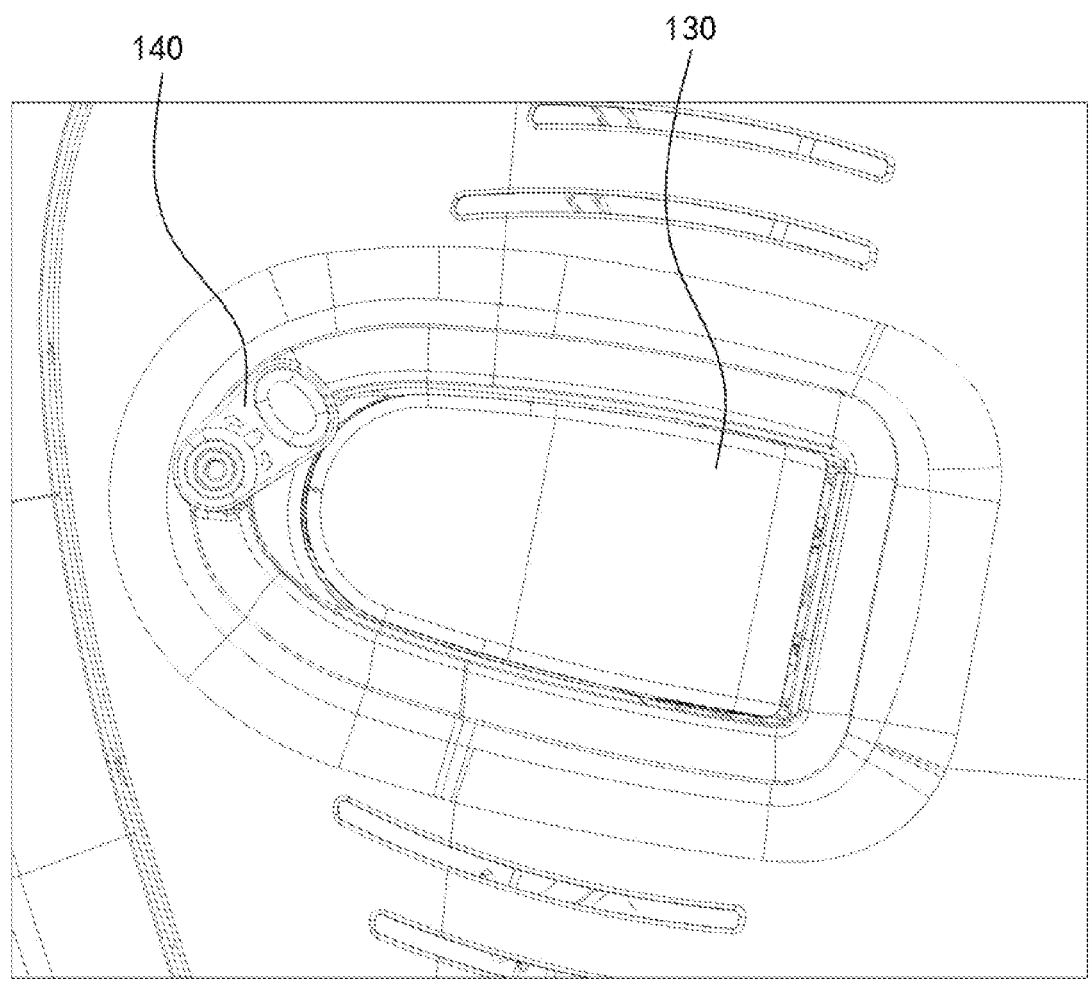
FIG. 3 is a partial enlarged view of FIG. 2.

Now refer to FIG. 3. FIG. 3 is a partial enlarged view of FIG. 2. A positional relationship between the limiting device 150 and the side impact protection block 130 can be seen more clearly from FIG. 3.

Figure 4:
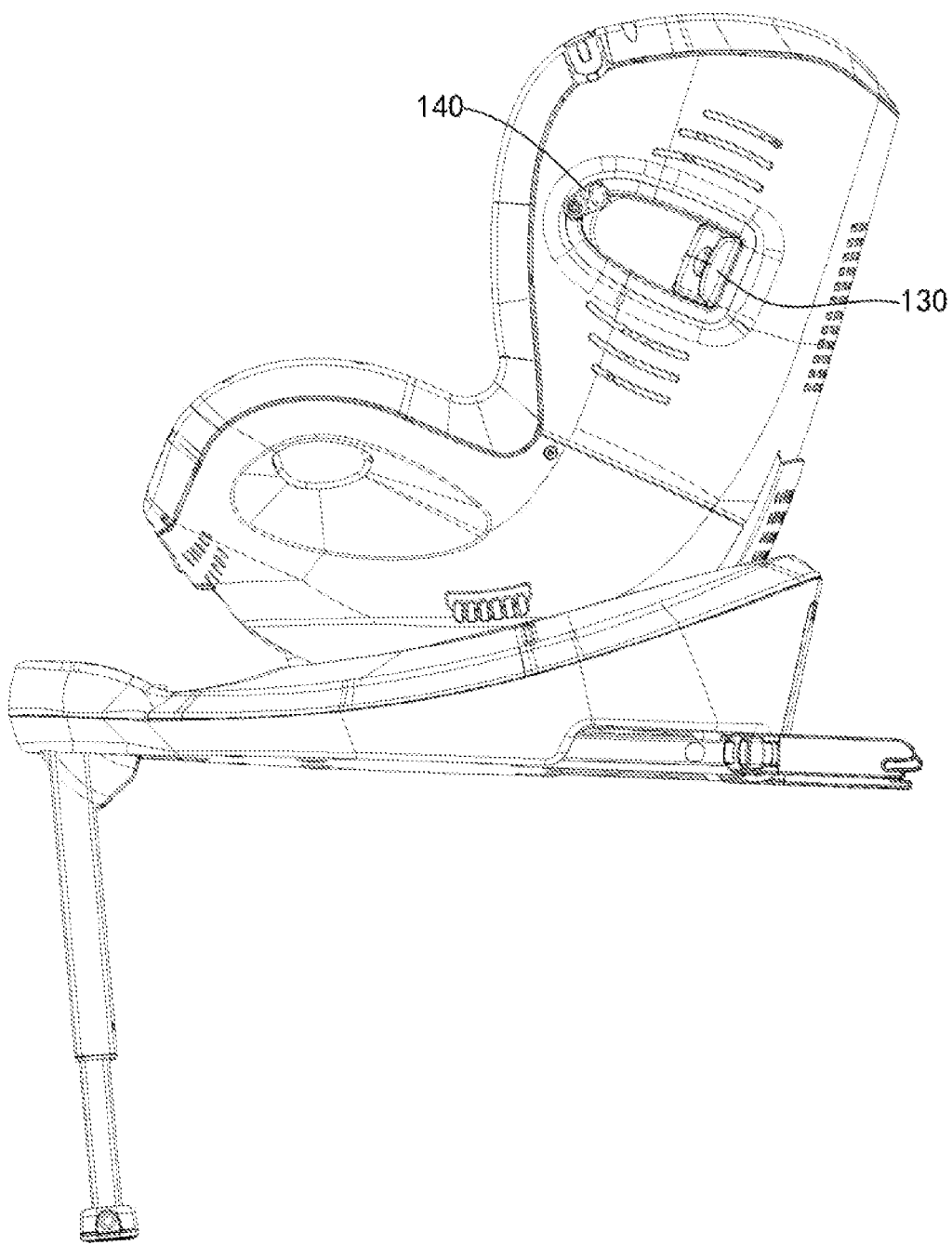
FIG. 4 is a perspective view of the seat according to the application, in which the limiting device is in the released position and the side impact protection block is in an unfolded position.

Now refer to FIG. 4. FIG. 4 is a perspective view of the child safety seat 100 according to the application, in which the limiting device 150 is in the released position and the side impact protection block 130 is in the unfolded position. Because the side impact protection block 130 is no longer blocked by the limiting device 150, it can move from the folded position to the unfolded position shown in FIG. 4.

Figure 5:
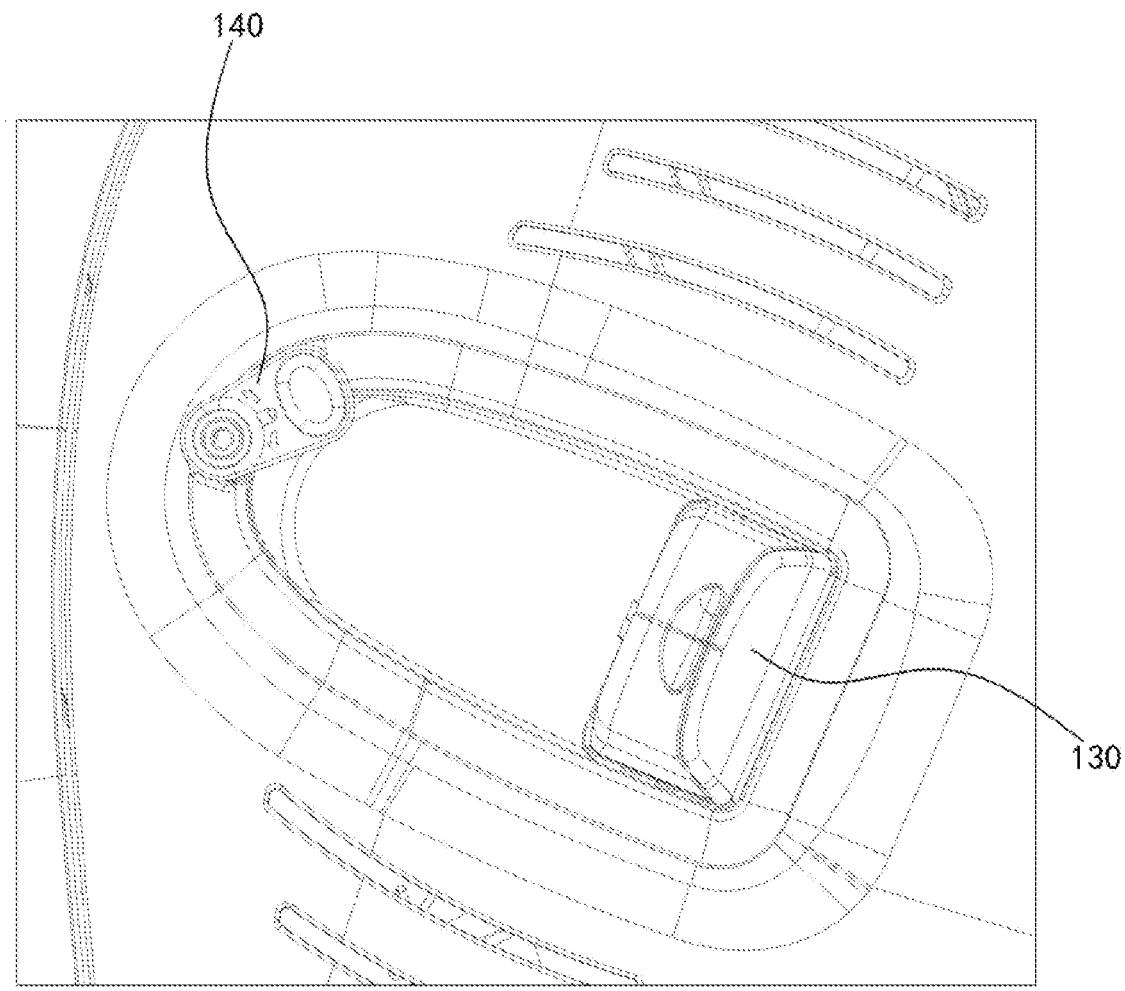
FIG. 5 is a partial enlarged view of FIG. 4.

Now refer to FIG. 5. FIG. 5 is a partial enlarged view of FIG. 4. The positional relationship between the limiting device 150 and the side impact protection block 130 can be seen more clearly from FIG. 5.

Figure 6:
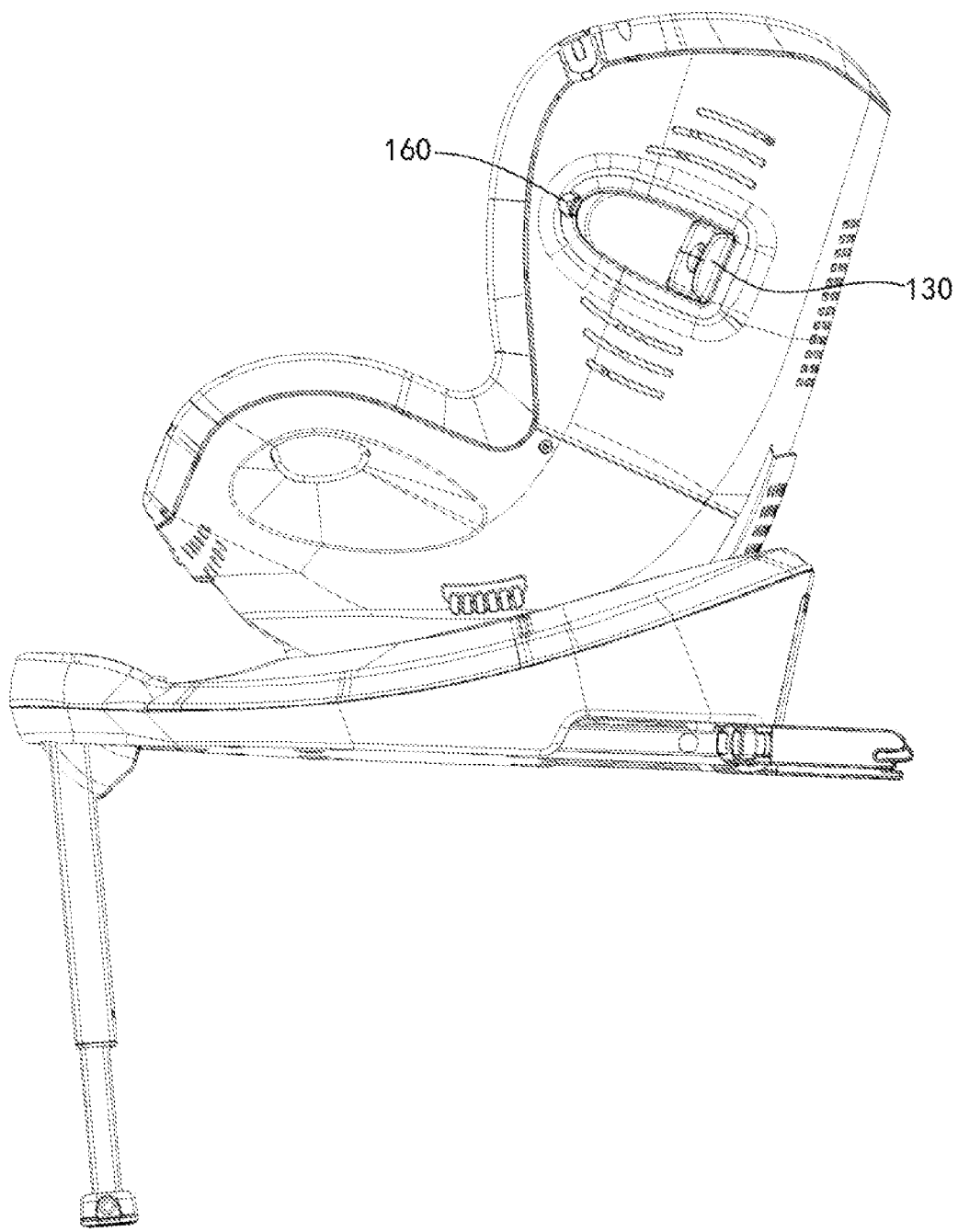
FIG. 6 is a perspective view of the seat according to the application, in which a restricting member of the limiting device is removed to show an mounting portion, and the side impact protection block is in the unfolded position.
Figure 7:
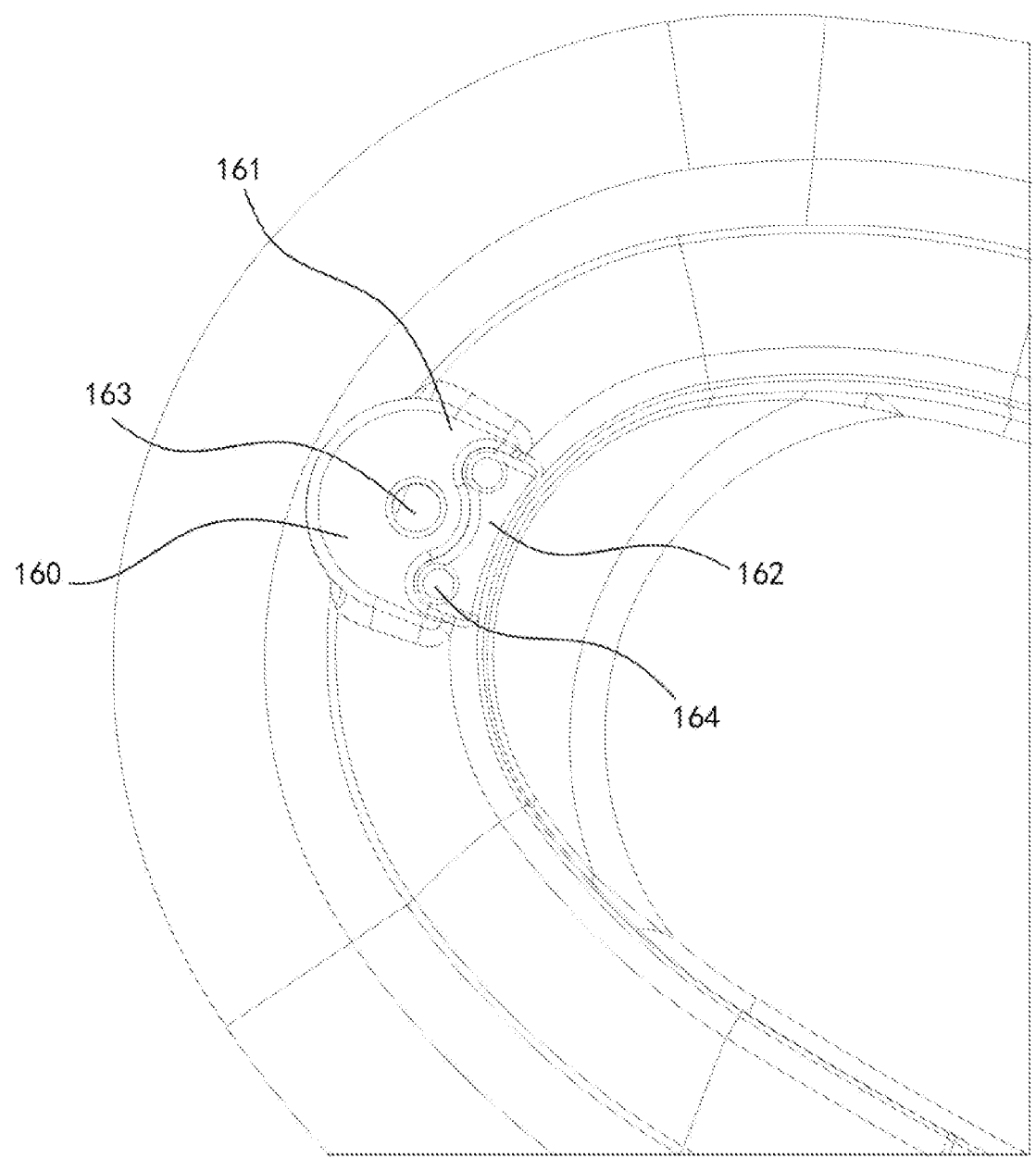
FIG. 7 is a partial enlarged view of FIG. 6.

Now refer to FIGS. 6 and 7. FIG. 6 is a perspective view of the child safety seat 100 according to the application, in which a restricting member 140 of the limiting device 150 is removed to show a mounting portion 160, and the side impact protection block 130 is in the unfolded position. FIG. 7 is a partial enlarged view of FIG. 6. The limiting device 150 includes a restricting member 140 and a mounting portion 160. Among them, the mounting portion 160 is a component fixed on the seat body 110, or the mounting portion 160 may be integrally formed on the seat body 110. Moreover, the restricting member 140 is rotatably connected to the mounting portion 160, so as to rotate in respect to the seat body 110. As shown in FIG. 7, after the restricting member 140 is removed, the structure of the mounting portion 160 can be seen more clearly.

Figure 8:
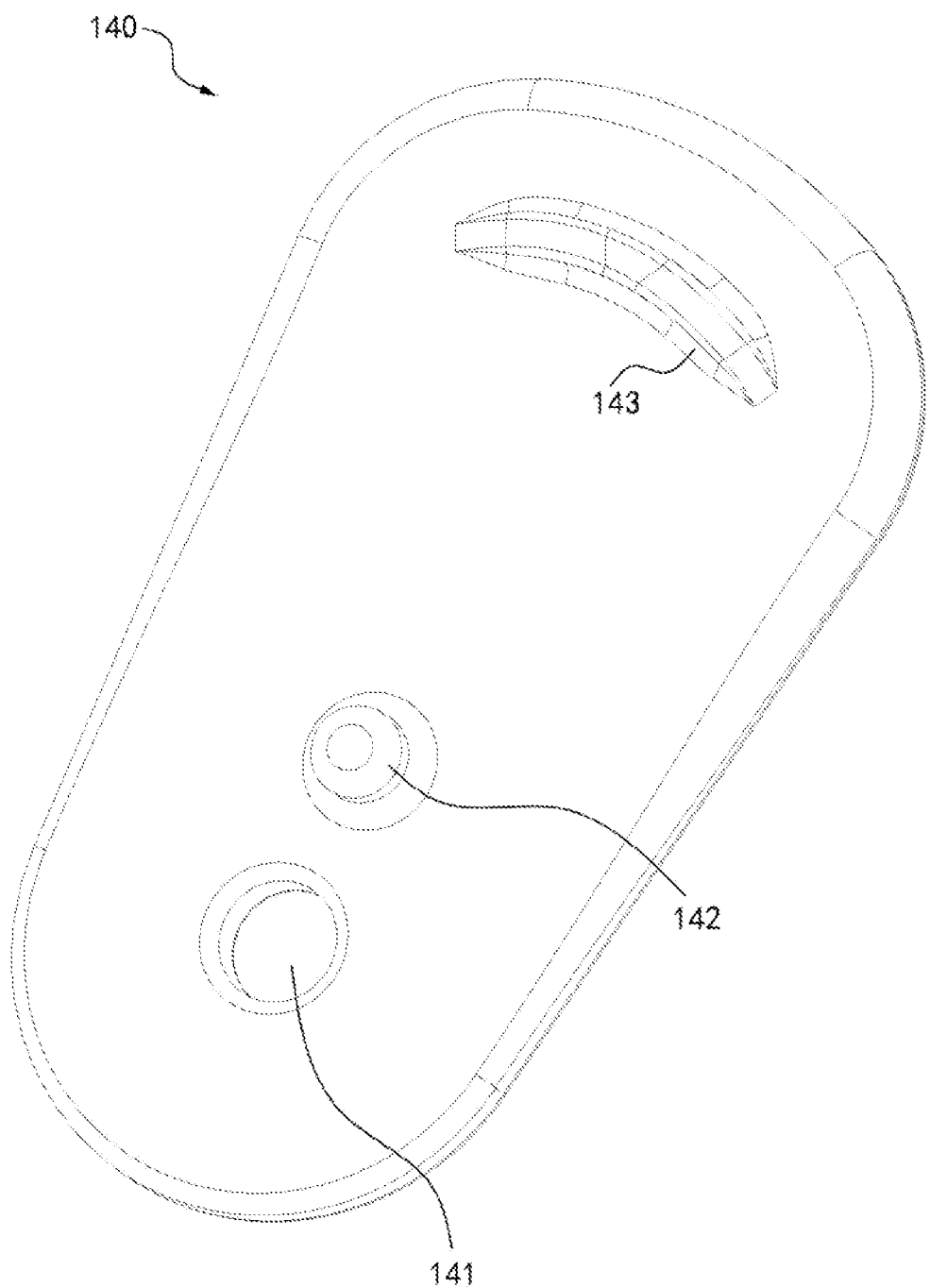
FIG. 8 is a perspective view showing a side of the restricting member facing the mounting portion.

The mounting portion 160 includes a disk portion 161, a sliding slot 162, a mounting portion shaft hole 163, and a positioning portion (i.e., a limiting bulge or a limiting recess) 164. The disk portion 161 is the main portion of the mounting portion 160, and the disk portion 161 is located in a plane substantially parallel to the side face of the seat body 110. The sliding slot 162 is located on a side of the disk portion 161 facing the side impact protection block 130, and is formed as an arc concave facing the seat body 110 so as to guide and limit the restricting member 140 to rotate around the mounting portion 160. The mounting portion shaft hole 163 is located at a center of the disk portion 161, and a rotating shaft (not shown) passes through the mounting portion shaft hole 163 and a restricting member hole 141 in the restricting member 140 (as shown in FIG. 8), such that the restricting member 140 can be rotatably assembled to the mounting portion 160. The positioning portion 164 is located at each of the two ends of the sliding slot 162, and forms a shape cooperation with the limiting protrusion 142 of the restricting member 14 to enable the restricting member 140 to stop at the released position and the locked position. In this embodiment, the positioning portion 164 is taken as an example of the limiting recess, and the positioning portion 164 is a limiting recess which is recessed in the sliding slot 162 toward the seat body 110. In other embodiments, the positioning portion may be a limiting bulge in the sliding slot 162 which is further raised from the seat body 110. In this embodiment, the positioning portion is located at both ends of the sliding slot 162. In other embodiments, the positioning portion may be located only at one end of the sliding slot 162.

Now refer to FIG. 8. FIG. 8 is a perspective view showing the side of the restricting member 140 facing the mounting portion 160. The structure of the restricting member 140, particularly the structure facing the side of the seat body 110, will be explained by referring to FIG. 8. The restricting member 140 has a rotating end and a free end, where the rotating end is rotatably coupled to the mounting portion 160, such that the restricting member 140 can rotate between the locked position and the released position in respect to the seat body 110. The restricting member 140 is provided with a contacting portion 143 on a side face of the free end facing the mounting portion 160 for contacting the side impact protection block 130 in the locked position, where the restricting member hole 141, the limiting protrusion 142 and contacting portion 143 are located in a longitudinal centerline in sequence, and the limiting protrusion 142 is closer to the restricting member hole 141 than the contacting portion 143. In this embodiment, the restricting member hole 141 is a circular shaft hole. In an embodiment, the restricting member 140 has a substantially left-right symmetrical structure, the limiting protrusion 142 may be located in a symmetry axis of the restricting member 140, and a distance to an extremity of the rotating end of the restricting member 140 is about one-third of the length of the symmetry axis. The restricting member 140 is provided with a contacting portion 143 on the side face of the free end facing the mounting portion 160 for contacting the side impact protection block 130 in the locked position. The contacting portion 143 may be formed as a crescent portion or an arc portion raised from the restricting member 140 and extending substantially along a rotation direction of the restricting member 140. In an embodiment, the rotating shaft, the limiting protrusion 142 and the contacting portion 143 are sequentially located in the symmetry axis (i.e., the longitudinal centerline), and the limiting protrusion 142 is closer to the rotating shaft than the contacting portion 143. In an embodiment, the contacting portion 143 is located near an edge of the free end.

In the illustrated embodiment, the restricting member 140 is symmetrical flat along its longitudinal centerline, and has a lateral width that gradually increases from the rotating end to the free end. In other embodiments, the restricting member 140 may also be formed in an asymmetrical shape. For example, the limiting protrusion 142 may not be formed in the longitudinal centerline of the restricting member 140, but at a position close to a longitudinal edge of a side of the restricting member 140. In such case, the limiting recess of the mounting portion 160 may be formed only at one end of the sliding slot 162 corresponding to the limiting protrusion 142.

In use, the user can lock or release side impact protection block by moving the restricting member 140 of the limiting device 150. Due to the shape cooperation between the limiting protrusion 142 of the restricting member 140 and the limiting recess of the mounting portion 160, the restricting member 140 can be maintained in the locked position or the released position.

Now a second embodiment according to the application will be described by referring to FIGS. 9-13. Similar to the first embodiment, the second embodiment also includes a child safety seat 200, a seat body 210, a base 220, a side impact protection block 230, a limiting device 250. The difference from the first embodiment is that the limiting device 250 of the second embodiment is moved in sliding movement, rather than in rotating movement in the first embodiment.

Figure 9:
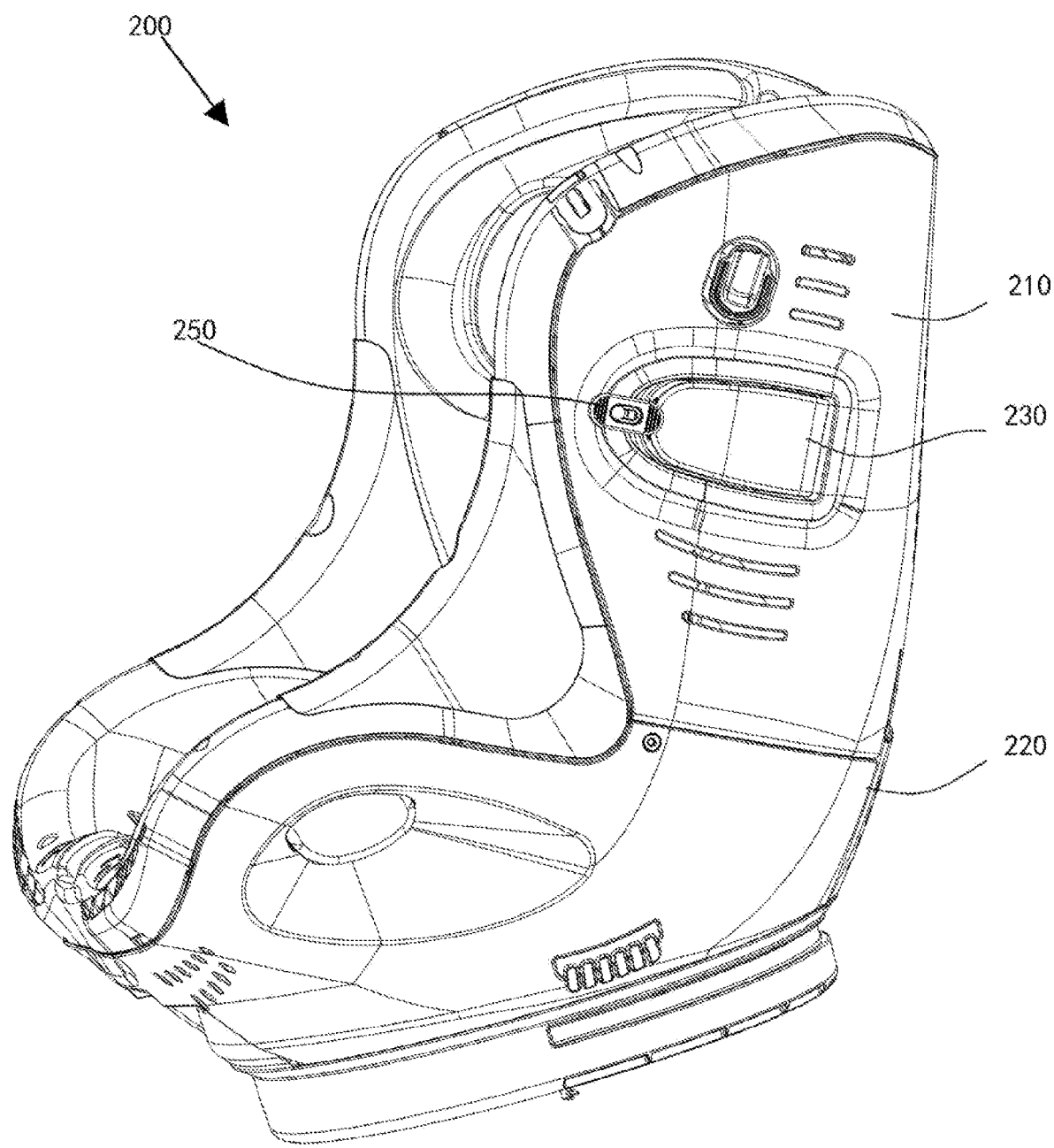
FIG. 9 is a perspective view of the seat according to the second embodiment of the application, in which the limiting device is in a locked position.
Figure 10:
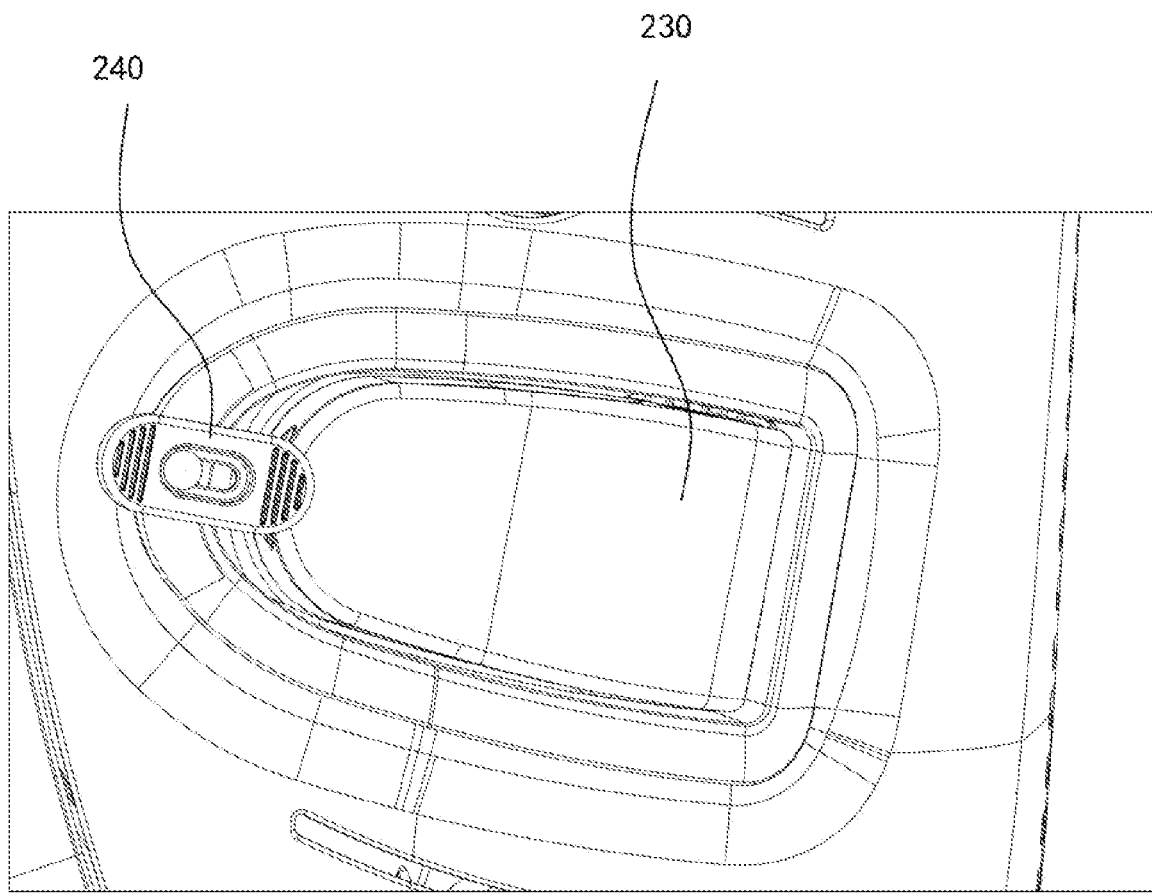
FIG. 10 is a partial enlarged view of FIG. 9.

Refer to FIGS. 9 and 10. FIG. 9 is a perspective view of the seat according to the second embodiment of the application, in which the limiting device is in the locked position; and FIG. 10 is a partial enlarged view of FIG. 9. In the state shown in FIGS. 9 and 10, the restricting member 240 of the limiting device 250 slides to the right side in the figure, such that an end of the restricting member 240 blocks the side impact protection block 230 so it cannot be ejected.

Figure 11:
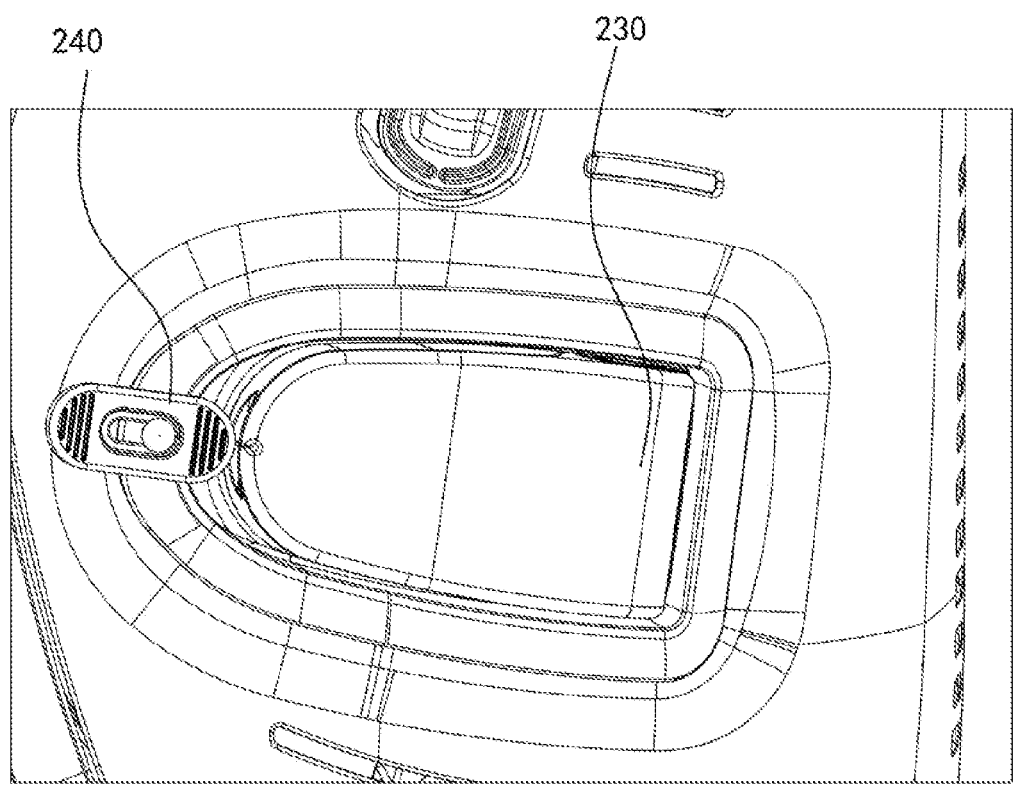
FIG. 11 is a perspective view of the seat according to the second embodiment of the application, in which the limiting device is in a released position.

Now refer to FIG. 11. FIG. 11 is a perspective view of the seat according to the second embodiment of the application, in which the limiting device is in the released position. In the state shown in FIG. 11, the restricting member 240 of the limiting device 250 slides to the left in the figure, such that the restricting member 240 no longer blocks the side impact protection block 230, thereby allowing it to be ejected.

Figure 12:
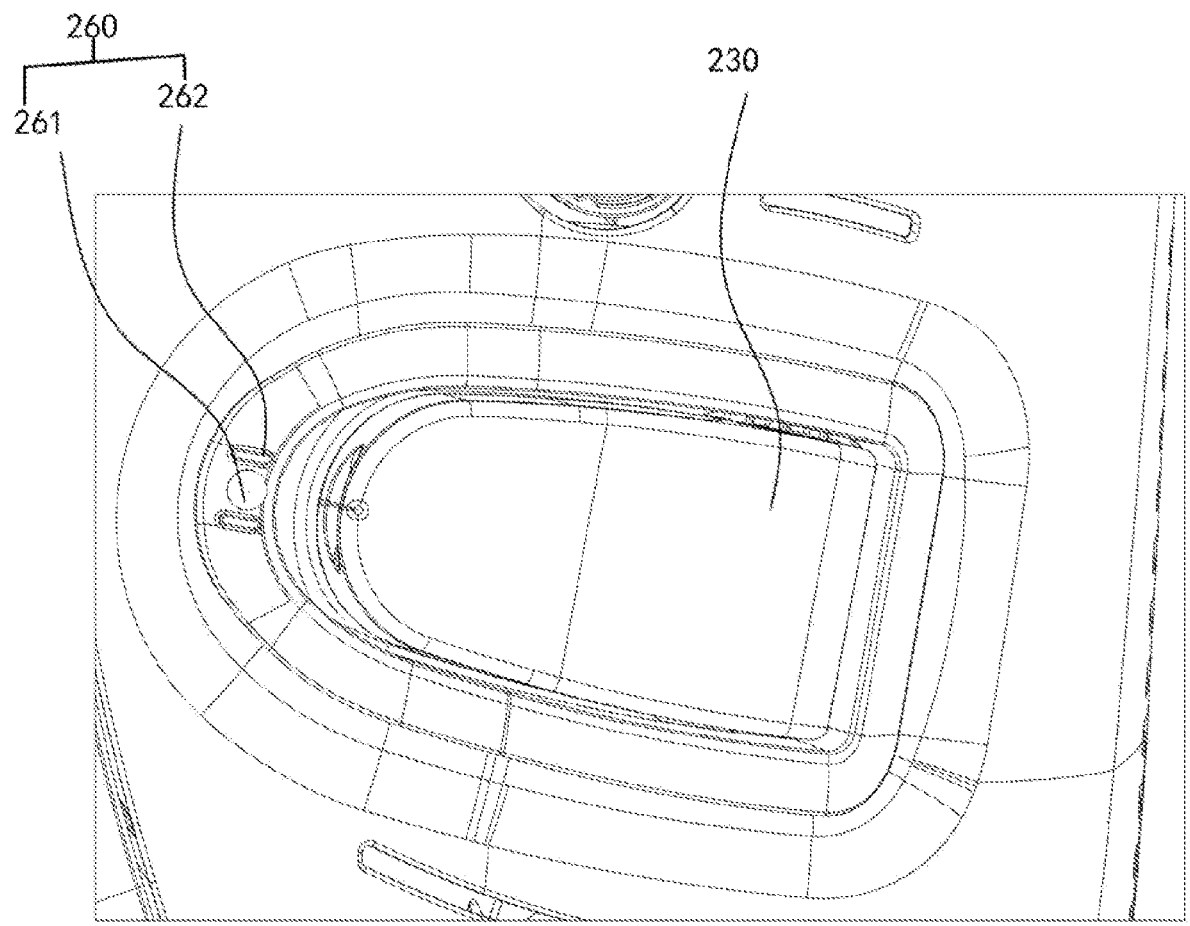
FIG. 12 is a perspective view of the seat according to the application, in which the restricting member is removed to show the mounting portion.

Now refer to FIG. 12. FIG. 12 is a perspective view of the seat according to the application, in which the restricting member of the limiting device is removed to show the mounting portion. As shown, the mounting portion 260 of the limiting device 250 includes a mushroom head 261 protruding from a side face of the seat body 210 and a slider 262. Among them, the mushroom head 261 is engaged in the restricting member 240 to allow the restricting member 240 to slide on the side face of the seat body 210, and the slider 262 is inserted into the restricting member 240 to limit a sliding direction of the restricting member 240, which will be detailed later. In this embodiment, the slider 262 is provided on both sides of the mushroom head 261 (specifically the upper and lower sides in the figure). In other embodiments, the slider 262 may be provided on only one side, or the slider 262 may be provided at other positions (e.g., the front side or the rear side) on the mushroom head 261. In this embodiment, the slider 262 has a long shape extending along the sliding direction of the restricting member 240 (i.e., the direction close to and away from the side impact protection block 230). In other embodiments, the slider 262 may also have different geometric shapes.

Figure 13:
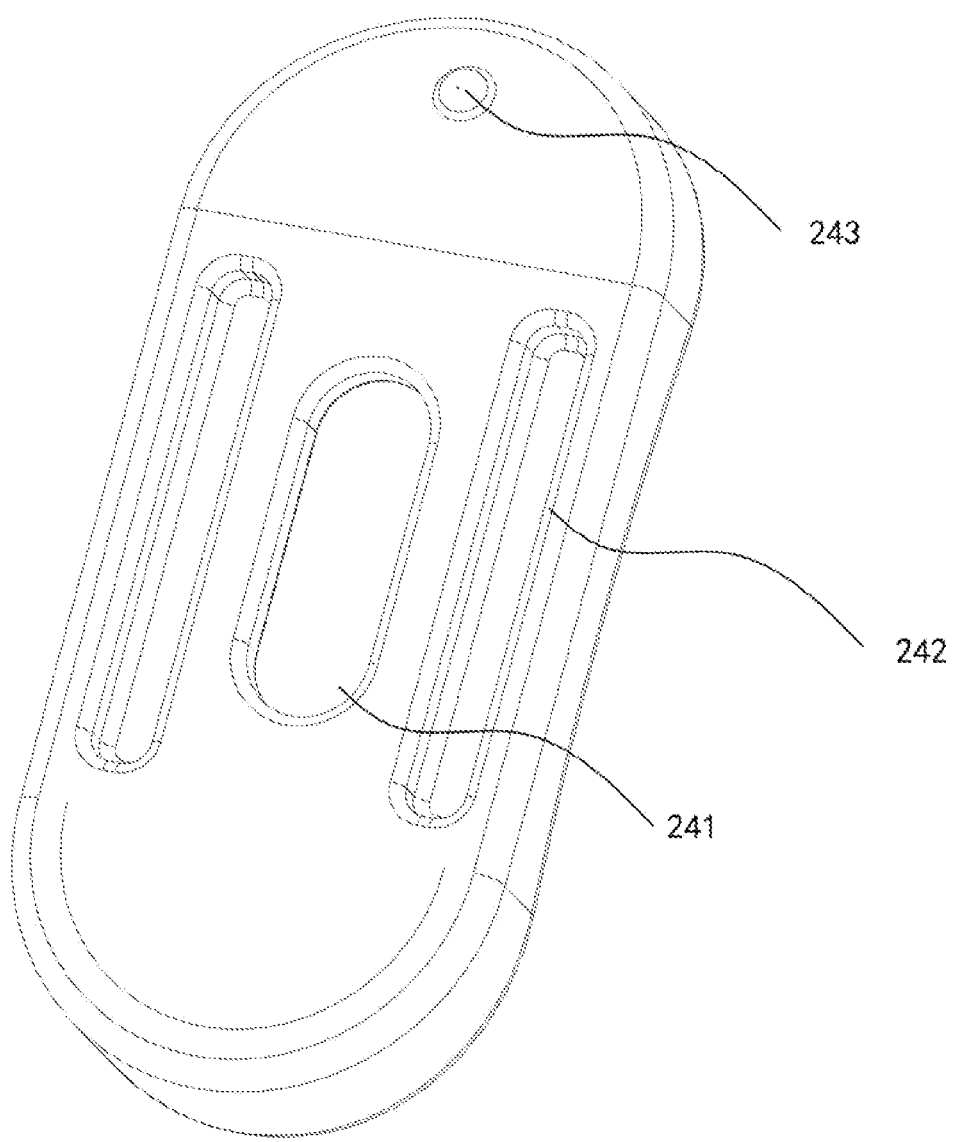
FIG. 13 is a perspective view showing a side of the restricting member facing the mounting portion in the second embodiment.

Now refer to FIG. 13. FIG. 13 is a perspective view showing a side of the limiting member facing the mounting part in the second embodiment. As shown, the restricting member 240 is generally elongated, and is circular at both ends. The restricting member 240 includes an elongated restricting member hole 241 extending in the longitudinal direction thereof, and slider holes 242 on both sides of the restricting member hole 241. At an end of the restricting member 240, a contacting portion 243 protruding toward the seat body is also arranged. When the limiting device 250 is in the locked position, the contacting portion 243 abuts against the side impact protection block 230 to prevent it from being ejected.

Figure 14:
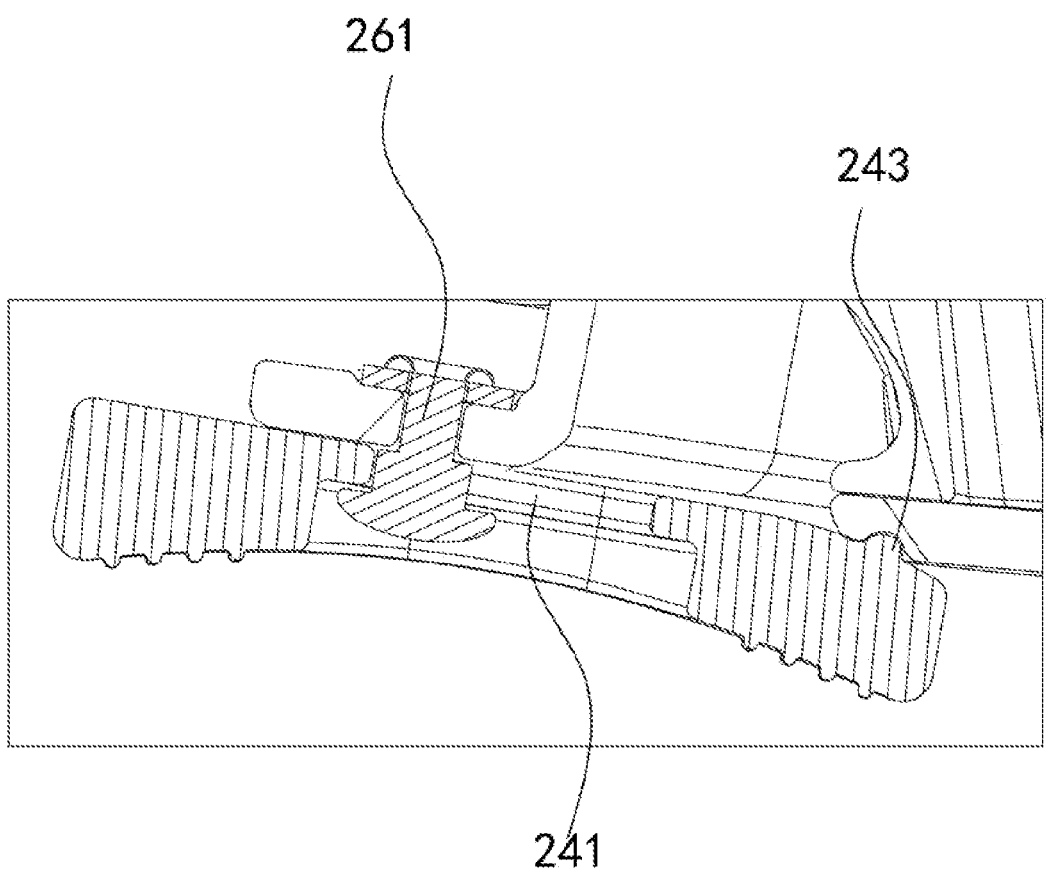
FIG. 14 is a transverse sectional view showing the limiting device in the second embodiment.

Now refer to FIG. 14. FIG. 14 is a transverse sectional view showing the limiting device in the second embodiment. As shown, the mushroom head 261 is engaged in the restricting member hole 241, so as to assemble the restricting member 240 to the mounting portion 260 while allowing the restricting member 240 to slide. A side of the restricting member 240 facing away from the seat body (i.e., the side facing the user) has a shape in which both ends are tilted and the middle is recessed, and both ends are provided with corrugated features to facilitate the user to operate. The contacting portion 243 of the restricting member 240 abuts against a corresponding recess of the side impact protection block 230, so as to stably lock the side impact protection block 230.

Although the present application has been described with reference to the typical embodiments, the terms used are illustrative and exemplary rather than restrictive. Since this application can be implemented in various forms without departing from the spirit and essence of the application, it should be understood, the above-mentioned embodiments are not limited to any of the foregoing details, but should be interpreted in the broadest sense within the scope defined by the claims. Therefore, all changes falling within the scope of the claims or their equivalents shall be covered by the claims.

LIST OF REFERENCE SIGNS 100, 200: child safety seat
110, 210: seat body
120, 220: base
130, 230: side impact protection block
150, 250: limiting device
140, 240: restricting member
141, 241: restricting member hole
142: limiting protrusion
242: slider hole
143, 243: contacting portion
160, 260: mounting portion
161: disk portion
261: mushroom head
162: sliding slot
262: slider
163: mounting portion shaft hole
164: positioning portion

What is claimed is:

1. A limiting device for limiting a pivoting of a side impact protection block in respect to a child safety seat, the limiting device comprising:
a mount located on a seat body of the child safety seat and arranged adjacent the side impact protection block, the mount comprising a fastener and two sliders protruding from a side face of the seat body; and
a restrictor having a first end and being arranged on the mount, such that the restrictor is configured to slide in a direction approaching and away from the side impact protection block to transition between a locked position and a released position, respectively;
wherein when in the locked position, the first end of the restrictor abuts against the side impact protection block to prevent the side impact protection block from moving in an unfolding direction in respect to the child safety seat, and when in the released position, the first end of the restrictor is away from the side impact protection block to allow the side impact protection block to move in the unfolding direction in respect to the child safety seat.

2. The limiting device according to claim 1, wherein the fastener is a mushroom head.

3. The limiting device according to claim 1, wherein the sliders are located on sides of the fastener and extend along the sliding direction of the restrictor.

4. The limiting device according to claim 3, wherein a first slider is located on one side of the fastener and a second slider is located on an opposite side of the fastener as the first slider.

5. The limiting device according to claim 4, wherein each of the first slider and the second slider extend along the sliding direction of the restrictor.

6. A limiting device for limiting a pivoting of a side impact protection block in respect to a child safety seat, the limiting device comprising:
a mount located on a seat body of the child safety seat and arranged adjacent the side impact protection block, the mount comprising a mushroom head and a slider protruding from a side face of the seat body; and
a restrictor being arranged on the mount such that the restrictor is configured to slide in a direction approaching and away from the side impact protection block to transition between a locked position and a released position, respectively, the restrictor comprising a first end, a restrictor hole extending in the sliding direction, and a slider hole extending in the sliding direction, wherein the mushroom head is inserted in the restrictor hole and the slider is inserted in the slider hole;
wherein when in the locked position, the first end of the restrictor abuts against the side impact protection block to prevent the side impact protection block from moving in an unfolding direction in respect to the child safety seat, and when in the released position, the first end of the restrictor is away from the side impact protection block to allow the side impact protection block to move in the unfolding direction in respect to the child safety seat.

7. The limiting device according to claim 6, wherein the restrictor slides on the side face of the seat body, and the mushroom head slides within the restrictor hole.

8. The limiting device according to claim 6, wherein the mount comprises two sliders protruding from the side face of the seat body, and the restrictor comprises two slider holes extending in the sliding direction.

9. The limiting device according to claim 8, wherein the restrictor hole is equally spaced between two slider holes.

10. The limiting device according to claim 6, wherein the restrictor has an elongated circular shape, such that the distal ends of the restrictor are circular.

11. The limiting device according to claim 10, wherein the restrictor has a constant width along a lengthwise direction of the restrictor.

12. A limiting device for limiting a pivoting of a side impact protection block in respect to a child safety seat, the limiting device comprising:
   a mount located on a seat body of the child safety seat and arranged adjacent the side impact protection block, the mount comprising a slider protruding from a side face of the seat body; and
   a restrictor being arranged on the mount such that the restrictor is configured to slide in a direction approaching and away from the side impact protection block to transition between a locked position and a released position, respectively, the restrictor comprising a first end and an elongated restrictor hole extending in a longitudinal direction of the restrictor, the elongated restrictor hole being positioned at a central location with respect to a length and a width of the restrictor;
   wherein when in the locked position, the first end of the restrictor abuts against the side impact protection block to prevent the side impact protection block from moving in an unfolding direction in respect to the child safety seat, and when in the released position, the first end of the restrictor is away from the side impact protection block to allow the side impact protection block to move in the unfolding direction in respect to the child safety seat.

13. The limiting device according to claim 12, wherein the restrictor includes two slider holes, with one slider hole being positioned on either side of the elongated restrictor hole.

14. The limiting device according to claim 13, wherein the two slider holes are arranged parallel to the elongated restrictor hole.

15. The limiting device according to claim 12, wherein the restrictor includes a contacting portion protruding from a surface of the restrictor, the contacting portion being configured to abut against the side impact protection block to prevent the side impact protection block from moving in the unfolding direction in respect to the child safety seat.

16. The limiting device according to claim 15, wherein the contacting portion is a circular shaped protrusion extending outwards from the surface of the restrictor.

* * * * *